Feb. 18, 1969  M. LEIBUNDGUT  3,427,943
CINEMATOGRAPHIC OR PHOTOGRAPHIC FILMING APPARATUS
Filed Oct. 5, 1966
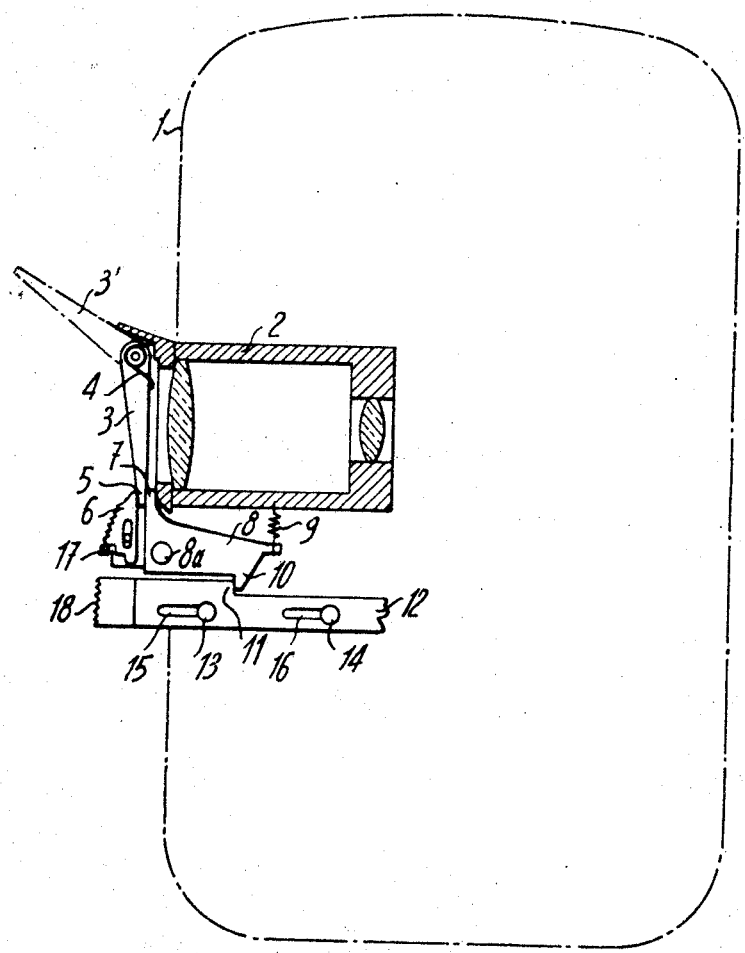
INVENTOR
MAX LEIBUNDGUT
BY Emery L. Groff Jr.
ATTORNEY

# United States Patent Office 3,427,943
Patented Feb. 18, 1969

3,427,943
CINEMATOGRAPHIC OR PHOTOGRAPHIC
FILMING APPARATUS
Max Leibundgut, Yverdon, Vaud, Switzerland, assignor to Paillard S.A., Sainte-Croix, Vaud, Switzerland, a company of Switzerland
Filed Oct. 5, 1966, Ser. No. 584,552
Claims priority, application Switzerland, Oct. 22, 1965, 14,651/65
U.S. Cl. 95—11                  3 Claims
Int. Cl. G03b 19/04, 19/18

ABSTRACT OF THE DISCLOSURE

An attachment for cameras which includes a cover for the objective lens to prevent dust from collecting thereon when the camera is not in use and a device for automatically locking the shutter release mechanism of the camera when the cover is in closed position so as to prevent accidental actuation thereof. A slidable catch which is engageable with an edge of the cover when the latter is closed is located on the camera casing adjacent an operating member for the shutter release mechanism. Movement of the catch to its unlatched position permits the cover to be opened and the shutter release mechanism to be unlocked so that the operating member can be actuated almost instantaneously when the user desires to take a picture.

---

Cinematographic or photographic filming apparatus often comprise a locking device adapted to prevent an accidental release of the apparatus. These locking devices comprise a member which must be actuated by the user before being able to operate the shutter-release.

In present day apparatus, the actuating of the locking device is often not very practical, so that the user frequently gives up employing the same and thus runs the risk of releasing the mechanism of the camera inadvertently during a manipulation of the latter, which results in uselessly exposing a portion of the film.

On the other hand, the majority of cameras are provided with a lid or closure cap for the objective-lens so as to prevent dust from dirtying the objective-lens when the camera is not in use. This is a very important step which is generally respected by users.

The invention has for its object means to automatically ensure the locking of the shutter release mechanism of a camera when the filming objective-lens is closed by a cover or a cap and the unlocking of said mechanism as soon as the objective-lens is uncovered.

The invention comprises generally an attachment for a cinematographic or photographic filming apparatus including a cover adapted to protect the objective-lens when the apparatus is not in use, a control member for a shutter releasing device and a locking device for the releasing device. The attachment is characterized in that it includes a member which is moved when positioning the cover in open or closed position, said member rendering operative the locking device.

The single figure of the accompanying drawing shows, diagrammatically and by way of example, one embodiment of the invention.

A cinematographic camera 1, shown very diagrammatically in dot and dash lines, is provided with an objective-lens 2 the mounting of which carries a cap or cover 3, hinged and subjected to the action of a return spring 4. The purpose of the spring is to maintain the cover 3 in the position 3' in which it uncovers the objective-lens 2 to permit filming.

When the cover 3 is brought into the closed position, indicated in full lines, its lower edge 5 cooperates with a pawl or catch 6 which is slidably mounted on a part of the case of the camera, and is pushed upwardly by a spring, not shown. The upper end of this catch 6 is cut in the shape of a duck-bill.

In the closed position of the cover 3, its end 5 bears on an arm 7 of a lever 8 hinged at 8a on the case of the camera and subjected to the action of a draw-spring 9.

The lever 8 has a second arm 10 at its opposite end cooperating with a shoulder 11 of a control member 12 connected to the shutter releasing device. The control member 12 slides on two lugs 13, 14 which fit into two slots 15 and 16 formed in said member. The control member actuates the shutter release device which is not shown in the drawing, because it may be constructed in any standard manner.

When the user wants to operate the camera, he pushes the catch 6 downwardly by engaging the scored surface 17 thereof. The catch 6, pushed back against the action of its spring, not shown, releases the cover 3 which is then brought into the position 3' by the spring 4. The movement of the cover 3 allows the lever 8 to rotate under the action of the spring 9, so that its arm 10 is disengaged from the shoulder 11 of the control member 12. Thus, the user may press on the scored end 18 of the member 12 in order to actuate the releasing device.

It is seen that in the embodiment described, not only is it not possible to release the mechanism of the camera when the cover 3 is in the closed position, but further the unlocking of the releasing device is accomplished in a very simple manner and may easily be actuated by means of a single finger of the user.

It should be noted that the arrangement described further offers additional safety which prevents the user from releasing the mechanism of the camera if he has forgotten to remove the cover which closes the objective-lens. Such forgetfulness may occur fairly easily in the case of a camera not provided with a reflex viewfinder.

It is obvious that the locking device need not necessarily act on the manual control member of the shutter releasing device and that it could just as well produce the blocking of any element of the releasing device, or even act on an electric current preventing the operation of the motor in the case of an electric drive camera.

I claim:

1. In a photographic camera including a casing, an objective lens and a mounting frame therefor, a shutter release mechanism and a control member for operating said shutter release mechanism, an attachment for covering the objective lens and locking said control member when the camera is not in use, said attachment comprising a cover, movable to open and closed positions to uncover and cover said objective lens, a lever pivotally mounted on said casing adjacent said objective lens and engageable with said control member for locking it in inoperative position, spring means normally urging said lever into unlocking position relative to said control member, catch means mounted on said casing for simultaneously locking said cover in closed position and retaining said lever in locking position, said cover when in closed position being confined between a portion of said catch means and a portion of said lever whereby upon release of said catch means from engagement with said cover, said cover is released for movement to open position and said lever is moved to its unlocked position by said spring means to permit actuation of said control member to operate said shutter release mechanism.

2. An attachment for photographic cameras according to claim 1 including spring means connected with said cover and normally urging it into open position.

3. An attachment for photographic cameras according to claim 2, wherein said control member includes a finger engaging portion adjacent said catch means to permit substantially instantaneous release of said cover and actuation of said control member for operating said shutter release mechanism.

References Cited

UNITED STATES PATENTS

| | | | |
|---|---|---|---|
| 2,457,211 | 12/1948 | De Smet et al. | 240—7.1 |
| 2,725,804 | 12/1955 | Herzfeld | 95—11 X |
| 3,240,143 | 3/1966 | Koeber et al. | 95—86 |
| 3,358,574 | 12/1967 | Liverano | 95—11 |

NORTON ANSHER, *Primary Examiner.*

C. E. SMITH, *Assistant Examiner.*